United States Patent Office 2,939,538
Patented June 7, 1960

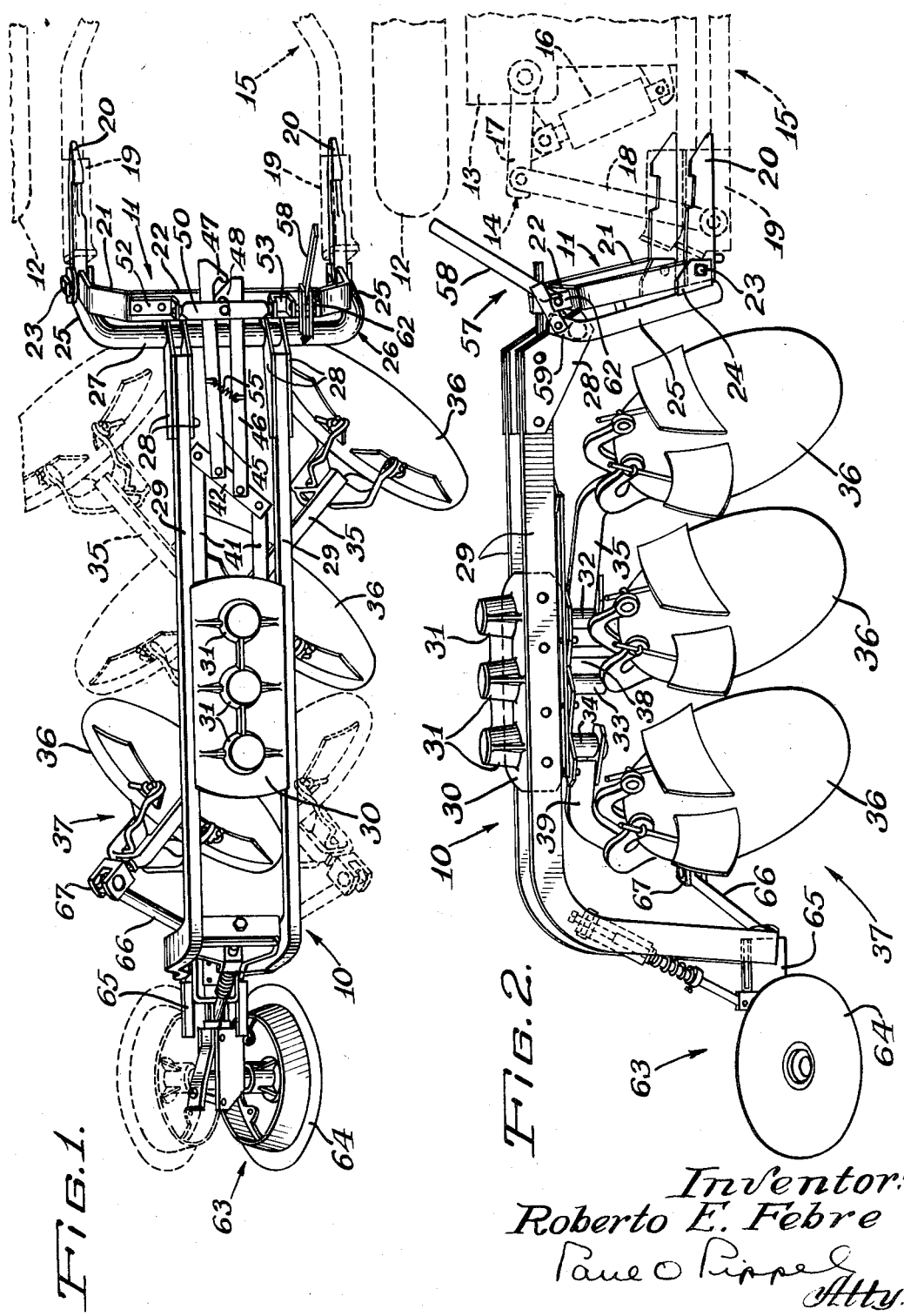

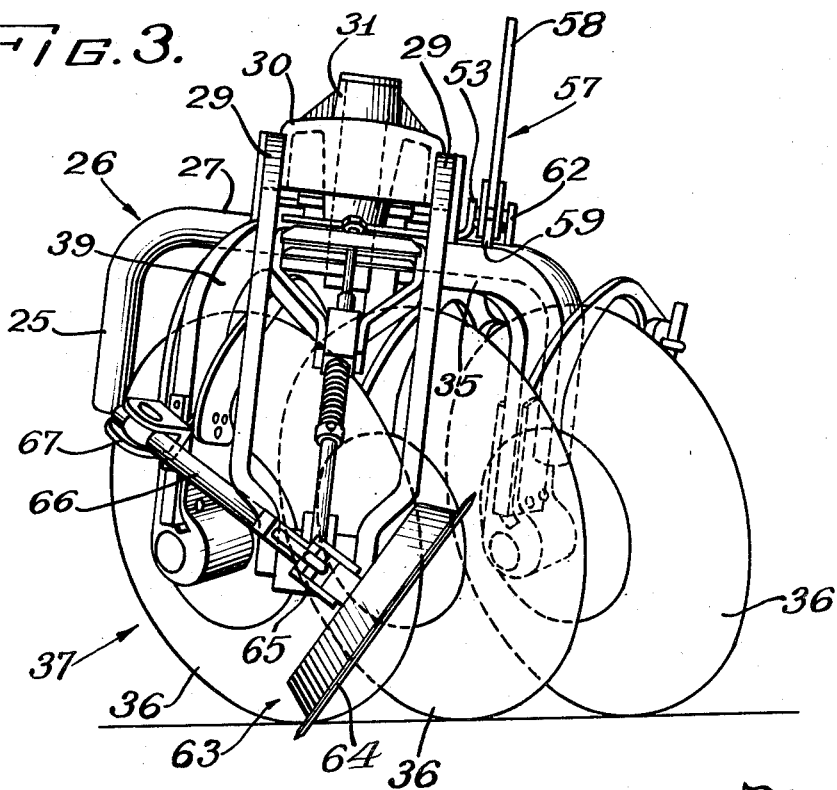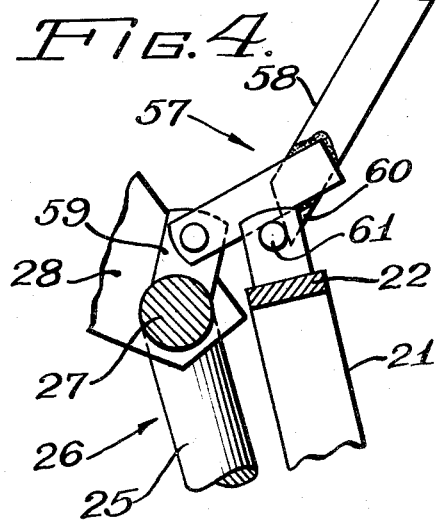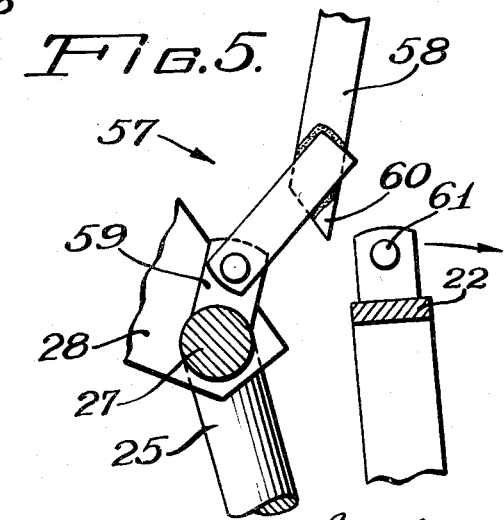

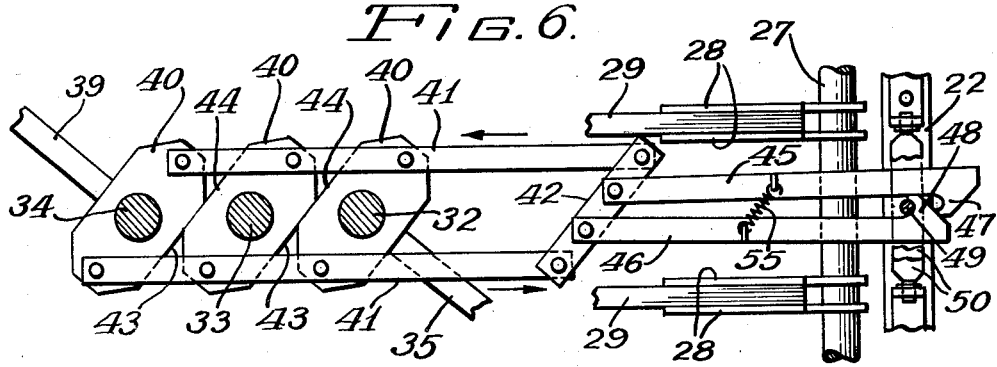
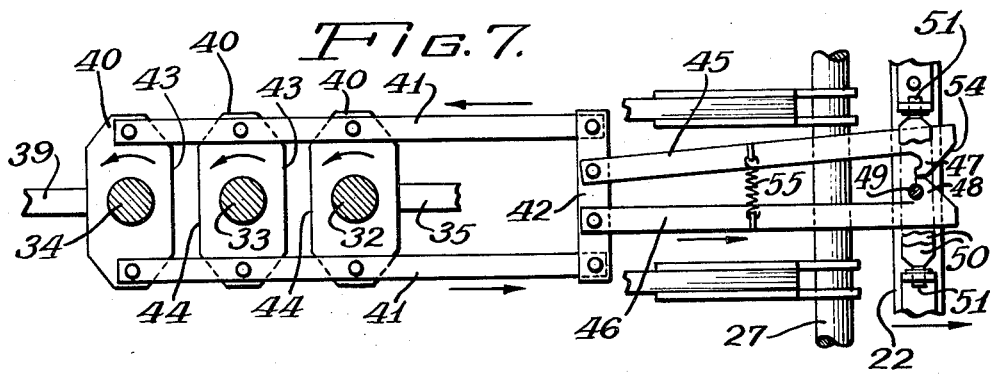
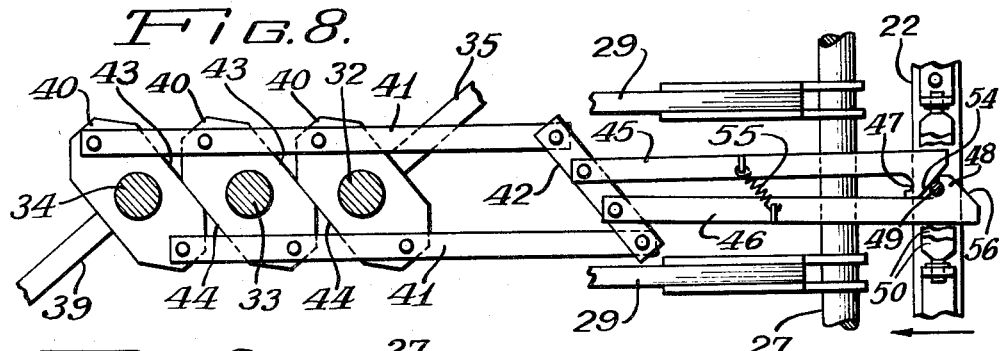
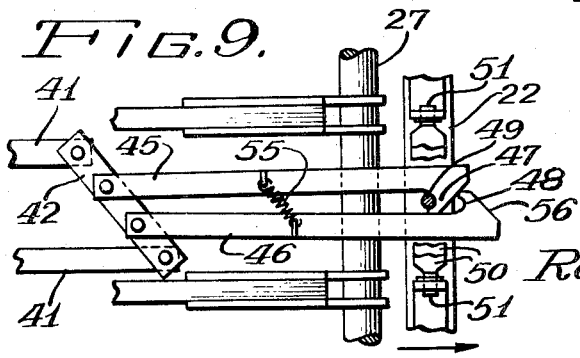

2,939,538

AUTOMATIC DISK SHIFTING DEVICE FOR TWO AND THREE DISK REVERSIBLE PLOW

Roberto E. Febre, Saltillo, Coahuila, Mexico, assignor to International Harvester Company, Chicago, Ill., a corporation of New Jersey Filed Oct. 25, 1957, Ser. No. 692,473

5 Claims. (Cl. 172—209)

This invention relates to agricultural implements and more particularly to two-way plows. More specifically, the invention concerns a reversible disk plow, wherein a single gang of diagonally disposed disks is swung laterally between positions for right and left-hand plowing.

An object of the invention is the provision of a reversible disk plow of novel construction.

Another object of the invention is the provision of a reversible disk plow having novel means for automatically reversing the disk gang to alternately dispose the disks in position for right and left-hand plowing.

Another object of the invention is the provision of a unitary reversible disk plow adapted for connection to a tractor to be carried thereon in transport and comprising a hitch frame and a disk gang-carrying frame hinged thereto on a transverse axis so that the tool frame pivots by gravity relative to the hitch frame when the latter is raised to a transport position on the tractor.

A further object of the invention is the provision of a reversible disk plow comprising a hitch frame and a disk gang-carrying frame hingedly connected to the hitch frame for pivoting relative thereto when the hitch is raised, another connection being provided between the hitch frame and the disk gang operative to utilize the weight of the tool frame to shift the disk gang from one operating position to the other.

Another object of the invention is the provision of releasable latch means optionally operable between the hitch frame and the tool-carrying frame for locking them together in a rigid unit but releasable to accommodate relative pivoting of the tool frame and the shifting of the disk gang.

Other objects and advantages of the invention will become clear from the following detailed description when read in conjunction with the accompanying drawings, wherein:

Figure 1 is a plan view of a two-way or reversible disk plow embodying the features of this invention and adapted to be directly connected to a tractor to be transported thereby;

Figure 2 is a view in side elevation of the structure shown in Figure 1;

Figure 3 is a rear end elevation of the plow shown in Figures 1 and 2;

Figure 4 is an enlarged sectional detail of the latch structure for holding the hitch frame and the tool-carrying frame rigidly together;

Figure 5 is a detail similar to Figure 4 showing the latch released;

Figure 6 is an enlarged diagrammatic plan view, partly in section, and with parts removed, showing the operating apparatus by which the disk gang is laterally shifted from one of its operating positions to the other, the parts being shown in the position for right-hand plowing;

Figure 7 is a view similar to Figure 6 showing the position of the parts when the plow has been raised to transport position;

Figure 8 is a view similar to Figures 6 and 7 but illustrating the position of the parts when the disk gang has been shifted to a position for left-hand operation; and Figure 9 is a detail showing the parts in position for left-hand plowing but with the gang shifting apparatus in position to automatically effect shifting of the disk gang the next time the implement is lifted.

In the drawings the numeral 10 designates the tool-carrying frame of a reversible disk plow having a hitch frame 11 adapted for connection to the implement attaching apparatus of a tractor to be propelled by the tractor and to be lifted thereon for transport. The tractor to which the implement of this invention is connectable may be of any conventional type, the position of the tractor wheels and implement attaching structure of a typical tractor being indicated in dotted lines in Figure 1, and the position of the tractor body and a typical hydraulic lifting apparatus being indicated in dotted lines in Figure 2. The tractor wheels are designated by the numeral 12, the tractor body by the number 13, the lifting apparatus by the number 14, and the implement attaching structure of the tractor by the numeral 15.

While the details of construction of the implement attaching structure and lifting apparatus of the tractor form no part of this invention, it might be noted that the lifting apparatus 14 includes a hydraulic ram 16 connected to a lift arm 17 which, in turn, is connected to a lift link 18 pivoted at its lower end to each of a pair of socket members 19 secured to the rear of and forming a part of the draft structure 15. Extension of the ram 16 from the position shown in Figure 2 raises the arms 17 and the draft structure 15.

The implement of this invention is adapted for integral association with the tractor to be raised and lowered with respect thereto between operating and transport positions. Connection between the implement and the tractor is made by the provision of a pair of laterally spaced shafts 20 forming a part of and projecting forwardly from the laterally spaced arms of an arch 21 having an upward transverse portion 22. Shafts 20 of hitch frame 11 are slidably receivable in the sockets 19 of the tractor draft structure, and are locked therein and releasable from said sockets by means which form no part of this invention. A further description of such means as well as an implement attaching apparatus of the type indicated may be had by reference to copending U.S. application Serial No. 338,652 filed February 25, 1953 (now abandoned).

Hitch frame 11 is pivotally connected at 23 to a pair of lugs 24 affixed to the lower ends of the laterally spaced arms 25 of a U-shaped member 26 having a transverse portion 27 affixed to laterally spaced pairs of triangularly shaped plates 28 secured to the forward ends of laterally spaced beams 29 forming a part of the tool-carrying frame 10.

Between the beams 29 there is secured a casting 30 having three upwardly projecting bearing portions 31 arranged parallel to the beams 29 and adapted to rotatably receive and retain the upper ends of longitudinally aligned spindles 32, 33 and 34. The lower end of spindle 32 has secured thereto a horizontal arm 35 which, in the position shown in solid lines in Figures 1 and 2, extends diagonally to the right. The outer end of arm 35 is bent downwardly and has mounted thereon an earth-working disk 36 forming a part of a disk gang generally indicated at 37. The central spindle 33 has secured thereto adjacent its axis a vertical standard 38 upon the lower end of which is mounted another disk 36 which is generally in alignment with the forwardmost disk 36, and the rearwardmost spindle 34 has secured to its lower end a horizontal arm 39 which extends diagonally rearwardly to the other side of the frame 10 from arm 35. Arm 39 is bent downwardly at its rear end and has mounted thereon another disk 36 which is generally in alignment with the other disks of the gang.

In the solid line position of Figure 1, the disk gang 37 is ready for right-hand plowing. At the end of a field where the direction of plowing is to be reversed, the operator raises the implement to a transport position by actuating the hydraulic ram 16 and swings the disk gang laterally to the reversed position, such as is shown in dotted lines in Figure 1 for left-hand plowing, the implement forming a furrow adjacent the previously made furrow. When the lifting apparatus 14 is actuated, by virtue of the pivotal connection at 23 of tool-carrying frame 10 to hitch frame 11, the hitch frame rises while the tool frame pivots about the axis 23 with respect thereto, the weight of the tool-carrying frame causing it to remain substantially in place as its forward end tilts upwardly with the hitch frame 11. Provision is made for limiting the downward tilting of the tool-frame 10 relative to the hitch frame so that the former will rise with the latter to an inoperative position on the tractor by mechanism which also serves to laterally shift the tool gang 37 from one of its operating positions to the other.

Each of the spindles 32, 33 and 34 has affixed thereto, below the beams 29, levers in the form of generally rectangular plates 40 extending laterally from opposite sides of the spindles and having pivotally connected to the ends thereof a pair of laterally spaced straps 41, the forward ends of which are pivotally connected to the ends of a transversely extending cross bar 42.

Swinging of cross bar 42 from the position shown in Figure 6 to the position shown in Figure 8 effects the swinging of levers 40 about the axes of spindles 32, 33 and 34 from the position of Figure 6 corresponding to a right-hand plowing position, to the position of Figure 8 corresponding to a left-hand plowing position. The lateral swinging of the disk gang 37 is limited in both the right-hand plowing position in Figure 6 and the left-hand plowing position of Figure 8 by the engagement of adjacent edges 43 and 44 to adjacent levers 40. In Figure 7 the levers 40 as well as the disks 36 of the gang are in a neutral centralized position with the disks in longitudinal alignment, and with the adjacent edges of the levers 40 out of engagement.

Shifting of the disk gang is accomplished by the force of gravity acting upon the tool-carrying frame 10. A pair of thrust links 45 and 46 are pivotally connected at their rear ends to cross bar 42. The forward ends of links 45 and 46 terminate in left-hand and right-hand hooks 47 and 48, respectively, adapted to alternately engage a vertical pin 49 extending between a pair of bars 50 secured at their ends to trunnions 51 pivotally mounted in openings provided in brackets 52 and 53 affixed to the transverse portion 22 of hitch frame 11.

Figures 6, 7 and 8 indicate the effect of the swinging away of the tool frame 10 with respect to hitch frame 11 as the implement is lifted at the end of a field and the disk gang reversed. In Figure 6 the parts are in position for right-hand operation of the disk gang. When the operator reaches the end of the field the tractor lift structure 14 is actuated to raise the draft structure 15. Hitch frame 11 rises with the draft structure and tool frame 10 swings away from the hitch frame about the axis of the hinge 23. Since right-hand hook 48 of thrust link 46 is engaged with pin 49, the separation of tool frame 10 from the hitch frame 11 rocks the transverse bar 42 first to the neutral position shown in Figure 7, and as lifting continues, spindles 32, 33 and 34 continue to rotate until the parts are in the position of Figure 8 with the disk gang ready for operation on the left-hand diagonal. When the implement is lowered, the tool-carrying frame and the hitch frame again swing together about the hinge 23, and as this occurs pin 49 rides down the angled edge 54 of member 45, moves away from hook 48, and by virtue of a spring 55 connecting members 45 and 46 and biasing them together, hook 47 moves into position engaging the pin 49. The new position of the parts is shown in Figure 9. Likewise, the lateral swinging of the disk gang 37 to the left-hand plowing position is again limited by the engagement of adjacent edges 43 and 44 of levers 40.

When the end of the field is again reached where the tractor is to be turned for plowing in the opposite direction, the same procedure is followed as before, link 45 being moved forwardly by its engagement with pin 49 and link 46 being moved rearwardly as bar 42 swings about a vertical axis. Hook 48 moves past hook 47 and its slanting edge 56 engages pin 49 and is ready to receive the pin when the implement is lowered to its operating position.

During operation the tool frame 10 and hitch frame 11 are locked together by releasable latching means 57 comprising a lever 58 pivotally mounted upon a lug 59 affixed to and projecting upwardly from the transverse portion 27 of frame member 26. Lever arm 58 is angled and is provided with a latch projection 60 engageable with a pin 61 supported at one end by bracket 53 and at the other end by a lug 62 affixed to the hitch frame 11.

When the plow is in operation the tractor operator moves lever 58 into latching position with part 60 engaging pin 61. When the end of the field is reached and the implement is to be lifted to reverse the position of the disk gang 37, the operator releases latch 57 to allow the pivotal separation of the disk gang-carrying frame 10 and hitch frame 11.

The plow of this invention is provided with a rear furrow wheel unit 63 arranged to bear against the furrow wall and offset the effects of side draft on the plow and arranged to reverse its operating position in the manner indicated in dotted lines in Figure 1 when the position of the disk gang is reversed. This rear furrow or tail wheel forms no part of the present invention although it may be briefly noted that the wheel 64 is mounted upon a supporting structure 65 for bodily swinging about a longitudinal axis between the positions for right and left-hand plowing indicated in Figure 1. Beams 29 are bent downwardly upon the lower ends thereof. Swinging of the furrow wheel assembly 63 about a longitudinal axis is accomplished by the provision of a rod 66 mounted upon the supporting structure 65 and receivable in a swivel 67 pivotally connected to the downwardly extending rear end of disk supporting standard 39. Thus lateral swinging of the standard 39 when the position of the disk gang is reversed transmits motion through rod 66 to the furrow wheel assembly 63 to shift its position simultaneously with the shifting of the position of the disk gang. A more detailed description of a comparable furrow wheel unit may be had by reference to the copending U.S. application referred to hereinbefore.

It is believed that the operation of the two-way disk plow of this invention will be understood from the foregoing description. However, it should likewise be understood that the invention has been described only in its preferred embodiment and that modifications may be made therein without departing from the spirit of the invention or the scope of the appended claims.

What is claimed is:

1. A reversible disk plow adapted for connection to a tractor having an implement attaching structure and lift means for raising and lowering the latter, comprising a hitch frame adapted to be releasably connected to said attaching structure to be raised therewith, a tool frame hingedly connected to said hitch frame for pivoting by gravity relative thereto upon raising the hitch frame, a disk gang pivotally mounted on said tool frame for alternate lateral swinging between positions for right and left-hand plowing, and linkage connecting said disk gang to said hitch frame for laterally shifting the disk gang in response to pivoting of the tool frame relative to the hitch frame comprising a pair of latch members pivotally connected to the disk gang and alternately connected to said hitch frame during successive liftings thereof to alternately shift said disk gang in opposite directions.

2. In an implement, a hitch frame adapted for attachment to a tractive vehicle having power lift means thereon connected to the hitch frame for raising the latter, a tool-carrying frame connected to the hitch frame for pivoting relative thereto on a transverse axis and accommodating swinging of the tool frame by gravity away from the hitch frame about said pivotal connection from a position with the tool frame locked to the hitch frame, a movable member mounted on the tool frame for shifting between two positions, and means limiting the swinging of the tool frame away from the hitch frame during lifting of the latter comprising a relatively stationary part on the hitch frame, means serving as a lever rockably mounted on the tool frame and operatively connected to the movable member to shift the latter from one of its positions to the other in response to rocking said lever, and a connecting member between said lever and said stationary part actuated by the swinging of the tool frame away from the hitch frame to rock said lever.

3. In an implement, a hitch frame adapted for attachment to a tractive vehicle having power lift means thereon connected to the hitch frame for raising the latter, a tool-carrying frame, means releasably locking the tool-carrying frame rigidly to the hitch frame to form an integral connection therebetween, means forming a pivotal connection between the tool frame and the hitch frame accommodating swinging of the tool frame by gravity away from the hitch frame upon release of said locking means when the hitch frame is raised, a movable member mounted on the tool frame for shifting between two positions, and connecting means between said movable member and said hitch frame to shift the movable member by the pivoting of the tool frame relative to the hitch frame when the latter is raised.

4. In an implement, a hitch frame adapted for attachment to a tractive vehicle having power lift means thereon connected to the hitch frame for raising the latter, a tool-carrying frame having a movable member thereon shiftable between two positions, releasable locking means forming an integral connection between the tool frame and the hitch frame, hinge means spaced vertically below said locking means forming a pivotal connection between the tool frame and the hitch frame and accommodating swinging thereof by gravity away from the hitch frame when said locking means is released and the hitch frame raised, and linkage connecting said hitch frame to said movable member for shifting the latter.

5. In an implement, a hitch frame adapted for attachment to a tractive vehicle having power lift means thereon connected to the hitch frame for raising the latter, a tool-carrying frame having a movable member thereon shiftable between two positions, releasable locking means forming an integral connection between the tool frame and the hitch frame, hinge means spaced vertically below said locking means forming a pivotal connection between the tool frame and the hitch frame and accommodating swinging thereof by gravity away from the hitch frame when said locking means is released and the hitch frame raised, and linkage connecting said hitch frame to said movable member for shifting the latter, said linkage comprising a pair of links connected at one end to said movable member and extending forwardly for alternate shifting forwardly and rearwardly with the movement of said movable member from one position to the other, a stationary part on the hitch frame, and hook means on the forward ends of said links alternately engageable with said stationary member for shifting said movable member by the swinging of the tool frame away from the hitch frame.

References Cited in the file of this patent
UNITED STATES PATENTS

| | | |
|---|---|---|
| 1,560,639 | Andrews | Nov. 10, 1925 |
| 2,337,801 | Cook | Dec. 28, 1943 |
| 2,552,891 | Evans et al. | May 15, 1951 |
| 2,578,942 | Onfrey | Dec. 18, 1951 |
| 2,613,491 | Evans et al. | Oct. 14, 1952 |
| 2,673,505 | Altgelt | Mar. 30, 1954 |
| 2,732,782 | Gurries et al. | Jan. 31, 1956 |